J. A. CRANDALL.
Children's Carriages.
No. 152,972.                          Patented July 14, 1874.
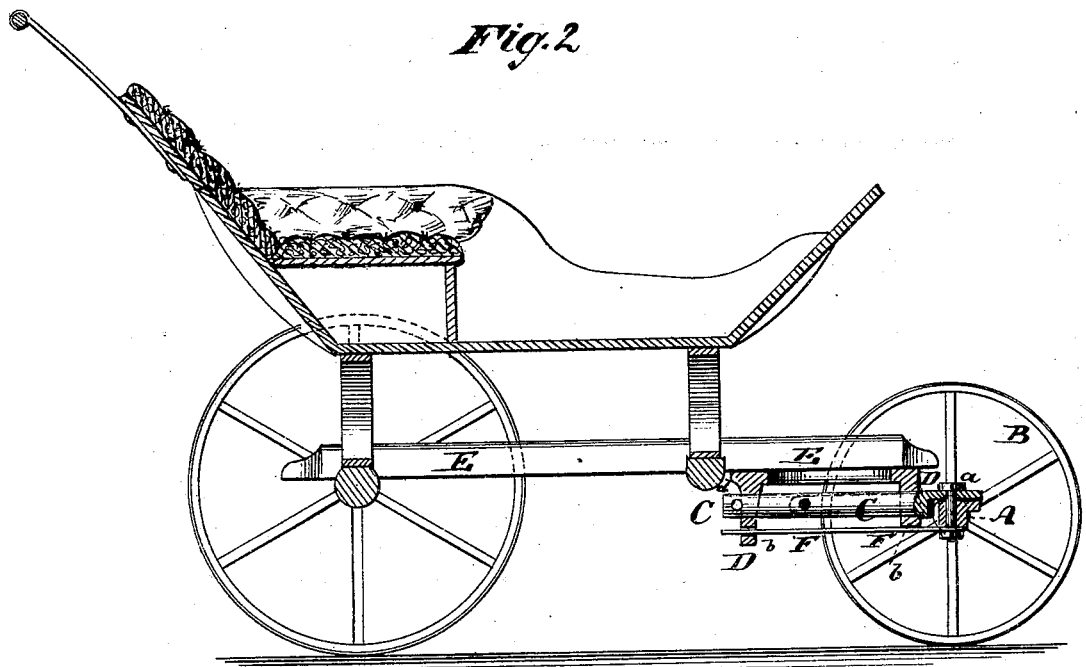
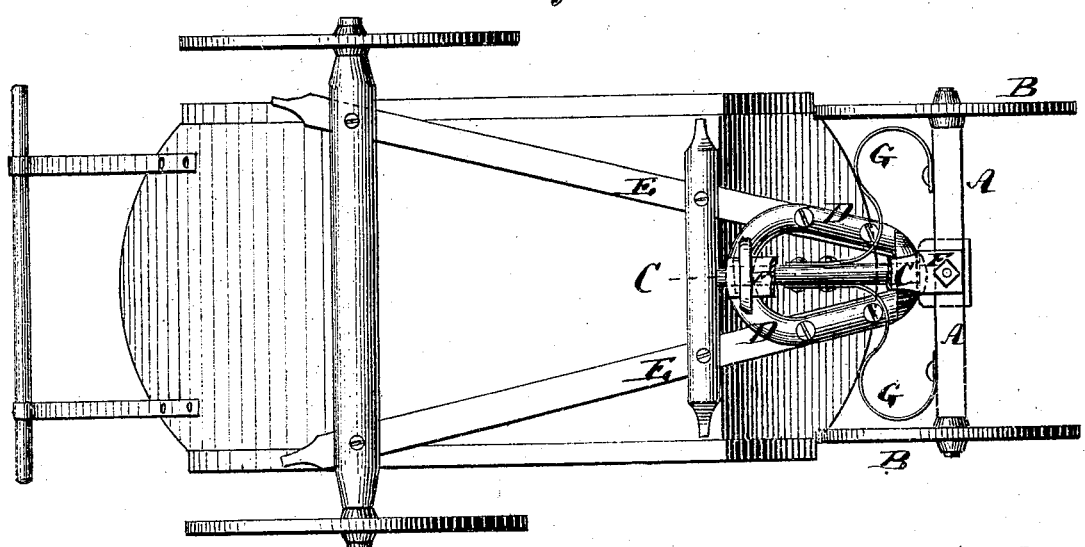
WITNESSES
F. v. Briesen
Ernest C. Webg.
INVENTOR
Jesse A. Crandall.
by his attorney
A. v. Briesen.

UNITED STATES PATENT OFFICE.

JESSE A. CRANDALL, OF BROOKLYN, NEW YORK.

IMPROVEMENT IN CHILDREN'S CARRIAGES.

Specification forming part of Letters Patent No. 152,972, dated July 14, 1874; application filed June 13, 1874.

*To all whom it may concern:*

Be it known that I, JESSE A. CRANDALL, of Brooklyn, in the county of Kings and State of New York, have invented a new Improvement in Children's Carriages, of which the following is a specification:

Figure 1 is a bottom view of a child's carriage containing my improvement. Fig. 2 is a longitudinal vertical section of the same on the line C C, Fig. 1.

Similar letters of reference indicate corresponding parts in both the figures.

The object of this invention is to so apply the front axle to the body of a child's carriage that such axle will be capable of swinging around a horizontal pivot, and also around a vertical pivot. By this arrangement of the axle the front wheels will be able to pass over small stones and other obstructions without jarring or proportionately raising the body of the wagon, and at the same time the front wheels with their axle can move at an angle to the rear wheels whenever the wagon is to describe a curve. Suitable springs are applied to the vibrating axle aforesaid for the purpose of keeping it in the normal position.

In the accompanying drawing, the letter A represents the front axle of a child's carriage. The same is made of wood or other material, and arranged to carry the front wheels B B. At its middle this axle A is connected, by a vertical pivot, $a$, with the front end of a shaft or bar, C, which bar hangs in downwardly-projecting ears $b$ of a casting, B, that is rigidly affixed to the perch or reach E of the carriage. The axle A can vibrate horizontally around the vertical pivot $a$, and can at the same time vibrate on, or rather with, the horizontal pivot C. The casting D, in place of which a suitable cross-bar may be applied to the body of the carriage, has, in its downwardly-projecting ears, circular apertures for receiving the bar or shaft C, and said bar or shaft is, at its rear end, prevented from slipping out of its place by a pin or head, $d$, as shown. F is a spring placed beneath the shaft C, and in line with the same, and made of flat steel or other metal. Its front end is riveted or secured to the axle A, and its flat rear end introduced through a narrow slot of the casting D. This spring F will tend to keep the axle A in a horizontal position, but will, nevertheless, allow it to vibrate around and with the shaft C, to enable one of the wheels B or the other to pass over small stones or other obstructions. G G are springs, which are riveted to the opposite sides of the shaft C and to the back of the axle A. These two springs have a tendency to hold the axle A parallel to the rear axle of the carriage, but they allow said axle A to vibrate on the pivot $a$ whenever the carriage is caused to describe a curve. I am therefore enabled by this mode of attaching the front axle to preserve the carriage-body in proper position without jarring or inconveniencing the child, even where the carriage is moving over uneven ground or caused to describe many curves.

I claim as my invention—

1. The axle A, pivoted by a vertical pivot, $a$, to the horizontal pivot C, all combined to be capable of vibrating on both pivots, as described.

2. The springs F and G G, in combination with the pivots C and $a$ and axle A of a child's carriage, substantially as specified.

J. A. CRANDALL.

Witnesses:
   A. V. BRIESEN,
   A. H. BROOKS.